(12) United States Patent  (10) Patent No.: US 8,700,406 B2
Grokop et al.  (45) Date of Patent: Apr. 15, 2014

(54) PRESERVING AUDIO DATA COLLECTION PRIVACY IN MOBILE DEVICES

(75) Inventors: Leonard H. Grokop, San Diego, CA (US); Vidya Narayanan, San Diego, CA (US); James W. Dolter, San Diego, CA (US); Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 203 days.

(21) Appl. No.: 13/213,294

(22) Filed: Aug. 19, 2011

(65) Prior Publication Data
US 2012/0303360 A1  Nov. 29, 2012

Related U.S. Application Data

(60) Provisional application No. 61/488,927, filed on May 23, 2011.

(51) Int. Cl.
| G10L 15/00 | (2013.01) |
| G10L 15/06 | (2013.01) |
| G10L 17/00 | (2013.01) |
| G10L 21/00 | (2013.01) |
| G10L 25/00 | (2013.01) |
| G10L 19/02 | (2013.01) |
| G10L 15/20 | (2006.01) |

(52) U.S. Cl.
USPC ........... 704/270; 704/231; 704/275; 704/225; 704/273; 704/246; 704/248; 704/219; 704/233; 704/243; 704/245; 704/229; 704/205

(58) Field of Classification Search
USPC ......... 704/229, 231, 275, 225, 273, 246, 248, 704/219, 270, 233, 243, 245, 205; 380/260, 380/247
See application file for complete search history.

(56) References Cited

U.S. PATENT DOCUMENTS

| 7,177,808 B2 * | 2/2007 | Yantorno et al. ............. 704/246 |
| 7,263,489 B2 * | 8/2007 | Cohen et al. ................. 704/270 |
| 7,720,012 B1 * | 5/2010 | Borah et al. ................. 370/260 |
| 2005/0180311 A1 * | 8/2005 | Wang et al. .................. 370/208 |

(Continued)

FOREIGN PATENT DOCUMENTS

| WO | WO2010054373 A2 | 5/2010 |
| WO | WO 2010054373 A2 * | 5/2010 |

OTHER PUBLICATIONS

Ma, L. et al., "Context Awareness using Environmental Noise Classification", Eurospeech-2003—8th European Conference on Speech Communication and Technology, Geneva, Switzerland, Sep. 1, 2003, p. 2237-2240, XP007006661.*

(Continued)

*Primary Examiner* — Pierre-Louis Desir
*Assistant Examiner* — Anne Thomas-Homescu
(74) *Attorney, Agent, or Firm* — Kilpatrick Townsend & Stockton LLP

(57) ABSTRACT

Techniques are disclosed for using the hardware and/or software of the mobile device to obscure speech in the audio data before a context determination is made by a context awareness application using the audio data. In particular, a subset of a continuous audio stream is captured such that speech (words, phrases and sentences) cannot be reliably reconstructed from the gathered audio. The subset is analyzed for audio characteristics, and a determination can be made regarding the ambient environment.

32 Claims, 7 Drawing Sheets

(56) References Cited

U.S. PATENT DOCUMENTS

| | | | |
|---|---|---|---|
| 2007/0276661 A1* | 11/2007 | Dimkovic et al. | 704/229 |
| 2008/0293397 A1* | 11/2008 | Gajdos et al. | 455/420 |
| 2009/0103728 A1* | 4/2009 | Patel | 380/247 |
| 2009/0125304 A1* | 5/2009 | Cho | 704/233 |
| 2009/0307779 A1* | 12/2009 | Doren | 726/26 |
| 2010/0063803 A1* | 3/2010 | Gao | 704/205 |
| 2010/0114344 A1* | 5/2010 | Hannaby | 700/94 |
| 2010/0121636 A1* | 5/2010 | Burke et al. | 704/233 |
| 2011/0077946 A1* | 3/2011 | Shectman et al. | 704/270 |
| 2011/0224986 A1* | 9/2011 | Summerfield | 704/246 |
| 2012/0136658 A1* | 5/2012 | Shrum et al. | 704/231 |
| 2012/0245941 A1* | 9/2012 | Cheyer | 704/246 |
| 2012/0278074 A1* | 11/2012 | Burke et al. | 704/235 |
| 2013/0006633 A1* | 1/2013 | Grokop et al. | 704/245 |
| 2013/0006634 A1* | 1/2013 | Grokop et al. | 704/245 |
| 2013/0035893 A1* | 2/2013 | Grokop et al. | 702/141 |
| 2013/0090926 A1* | 4/2013 | Grokop et al. | 704/243 |

OTHER PUBLICATIONS

Ellis, D. and Lee, K. "Minimal-Impact Audio-Based Personal Archives." LabROSA, Dept. of Elec. Eng. Columbia University.*

Robert G. Malkin. "The CLEAR 2006 CMU Acoustic Environment Classification System." R. Stiefelhagen and J. Garofolo (Eds.): CLEAR 2006, LNCS 4122, pp. 323-330, 2007.*

Ellis, D. and Lee, K. "Minimal-Impact Audio-Based Personal Archives." LabROSA, Dept. of Elec. Eng. Columbia University, 2004.*

S. Ramamohan and S. Dandapat, "Sinusoidal Model-Based Analysis and Classification of Stressed Speech", IEEE Transactions on Audio, Speech, and Language Processing, vol. 14, No. 3, May 2006.*

Gao Hui, Chen Shanguang, Su Guangchuan. "Emotion Classification of Mandarin Speech Based on TEO Nonlinear Features", Eighth ACIS International Conference on Software Engineering, Artificial Intelligence, Networking, and Parallel/Distributed Computing, 2007.*

Christoph, U. et al., "Automatic context detection of a mobile user", Proceedings of the 2010 International Conference on Wireless Information Networks and Systems (WINSYS), Jul. 26, 2010, pp. 1-6, IEEE, XP031936589.*

Ma, L. et al., "Context Awareness using Environmental Noise Classification", Eurospeech—2003—8th European Conference on Speech Communication and Technology, Geneva, Switzerland, Sep. 1, 2003, p. 2237-2240, XP007006661.*

International Search Report and Written Opinion—PCT/US2012/037783—ISA/EPO—Jul. 26, 2012.

* cited by examiner

PRESERVING AUDIO DATA COLLECTION PRIVACY IN MOBILE DEVICES

CROSS-REFERENCES TO RELATED APPLICATIONS

This application claims priority to U.S. Provisional Patent Application No. 61/488,927, filed May 23, 2011, entitled "PRESERVING AUDIO DATA COLLECTION PRIVACY IN MOBILE DEVICES," all of which is hereby incorporated herein by reference for all purposes.

BACKGROUND

Mobile devices are incredibly widespread in today's society. For example, people use cellular phones, smart phones, personal digital assistants, laptop computers, pagers, tablet computers, etc. to send and receive data wirelessly from countless locations. Moreover, advancements in wireless communication technology have greatly increased the versatility of today's mobile devices, enabling users to perform a wide range of tasks from a single, portable device that conventionally required either multiple devices or larger, non-portable equipment.

For example, mobile devices can be configured to determine what environment (e.g., restaurant, car, park, airport, etc.) a mobile device user may be in through a process called context determination. Context awareness applications that perform such context determinations seek to determine the environment of a mobile device by utilizing information from the mobile device's sensor inputs, such as GPS, WiFi and BlueTooth®. In many scenarios, classifying audio from the mobile device's microphone is highly valuable in making context determinations, but the process of collecting audio that may include speech can raise privacy issues.

SUMMARY

Techniques disclosed herein provide for using the hardware and/or software of a mobile device to obscure speech in the audio data before a context determination is made by a context awareness application using the audio data. In particular, a subset of a continuous audio stream is captured such that speech (words, phrases and sentences) cannot be reliably reconstructed from the gathered audio. The subset is analyzed for audio characteristics, and a determination can be made regarding the ambient environment.

In some embodiments, a method of privacy-sensitive audio analysis is presented. The method may include capturing a subset of audio data contained in a continuous audio stream. The continuous audio stream may contain human speech. The subset of audio data may obscure content of the human speech. The method may include analyzing the subset of audio data for audio characteristics. The method may include making a determination of an ambient environment, based, at least in part, on the audio characteristics.

Embodiments of such a method may include one or more of the following: The subset of audio data may comprise a computed function of the continuous audio stream having a lesser number of bits than is needed to reproduce the continuous audio stream with intelligible fidelity. The subset of audio data may comprise a plurality of audio data segments, each audio data segment comprising data from a different temporal component of the continuous audio stream. The method may include making a determination of an identity of a person based, at least in part, on the audio characteristics. The plurality of audio data segments may comprise between 30 ms to 100 ms of recorded audio. Each temporal component of the continuous audio stream may be between 250 ms to 2 s in length. The method may include randomly altering an order of the plurality of audio data segments before analyzing the subset of audio data. Randomly altering the order of the plurality of audio data segments may be based, at least in part, on information from one of: a Global Positioning System (GPS) device, signal noise from circuitry within a mobile device, signal noise from a microphone, and signal noise from an antenna.

In some embodiments, a device for obscuring privacy-sensitive audio is presented. The device may include a microphone. The device may include a processing unit communicatively coupled to the microphone. The processing unit may be configured to capture a subset of audio data contained in a continuous audio stream represented in a signal from the microphone. The continuous audio stream may contain human speech. The subset of audio data may obscure content of the human speech. The processing unit may be configured to analyze the subset of audio data for audio characteristics. The processing unit may be configured to make a determination of an ambient environment, based, at least in part, on the audio characteristics.

Embodiments of such a device may include one or more of the following: The subset of audio data may comprise a computed function of the continuous audio stream having a lesser number of bits than is needed to reproduce the continuous audio stream with intelligible fidelity. The subset of audio data may comprise a plurality of audio data segments, each audio data segment comprising data from a different temporal component of the continuous audio stream. The processing unit may be configured to make a determination of an identity of a person based, at least in part, on the audio characteristics. Each of the plurality of audio data segments may comprise between 30 ms to 100 ms of recorded audio. Each temporal component of the continuous audio stream may be between 250 ms to 2 s in length. The device wherein the processing unit is further configured to randomly altering an order of the plurality of audio data segments before analyzing the subset of audio data. Randomly altering the order of the plurality of audio data segments may be based, at least in part, on information from one of: a Global Positioning System (GPS) device, signal noise from circuitry within a mobile device, signal noise from the microphone, and signal noise from an antenna.

In some embodiments, a system for determining an environment associated with a mobile device is presented. The system may include an audio sensor configured to receive a continuous audio stream. The system may include at least one processing unit coupled to the audio sensor. The processing unit may be configured to capture a subset of audio data contained in the continuous audio stream, such that the subset of audio data obscures content of human speech included in the continuous audio stream. The processing unit may be configured to analyze the subset of audio data for audio characteristics. The processing unit may be configured to make a determination of an ambient environment, based, at least in part, on the audio characteristics.

Embodiments of such a system may include one or more of the following: The system may include a network interface configured to send information representing the subset of audio data via a network to a location remote from the mobile device. The at least one processing unit may be configured to make the determination of the ambient environment at the location remote from the mobile device. The subset of audio data may comprise a plurality of audio data segments, each audio data segment comprising data from a different temporal component of the continuous audio stream. The at least one processing unit may be configured to make a determination of an identity of a person based, at least in part, on the audio characteristics. Each of the plurality of audio data segments may comprise between 30 ms to 100 ms of recorded audio. Each temporal component of the continuous audio stream may be between 250 ms to 2 s in length. The processing unit may be further configured to randomly alter an order of the plurality of audio data segments before analyzing the subset of audio data.

In some embodiments, a computer program product residing on a non-transitory processor-readable medium is presented. The non-transitory processor-readable medium includes processor-readable instructions configured to cause a processor to capture a subset of audio data contained in a continuous audio stream. The continuous audio stream may contains human speech. The subset of audio data may obscure content of the human speech. The processor-readable instructions may be configured to cause the processor to analyze the subset of audio data for audio characteristics. The processor-readable instructions may be configured to cause the processor to make a determination of an ambient environment, based, at least in part, on the audio characteristics.

Embodiments of such a computer program product may include one or more of the following: The subset of audio data may comprise a computed function of the continuous audio stream having a lesser number of bits than is needed to reproduce the continuous audio stream with intelligible fidelity. The subset of audio data may comprise a plurality of audio data segments, each audio data segment comprising data from a different temporal component of the continuous audio stream. The processor-readable instructions may be configured to cause the processor to make a determination of an identity of a person based, at least in part, on the audio characteristics. Each of the plurality of audio data segments may comprise between 30 ms to 100 ms of recorded audio. Each temporal component of the continuous audio stream may be between 250 ms to 2 s in length. The processor-readable instructions may be configured to randomly alter an order of the plurality of audio data segments before analyzing the subset of audio data. The processor-readable instructions for randomly altering the order of the plurality of audio data segments is based, at least in part, on information from one of: a Global Positioning System (GPS) device, signal noise from circuitry within a mobile device, signal noise from a microphone, and signal noise from an antenna.

In some embodiments, a device for obscuring privacy-sensitive audio is presented. The device may include means for capturing a subset of audio data contained in a continuous audio stream represented in a signal from a microphone. The continuous audio stream may contain human speech. The subset of audio data may obscure content of the human speech. The device may include means for analyzing the subset of audio data for audio characteristics. The device may include means for determining an ambient environment, based, at least in part, on the audio characteristics.

Embodiments of such a device may include one or more of the following: The means for capturing the subset of audio data may be configured to capture the subset of audio data in accordance with a computed function of the continuous audio stream having a lesser number of bits than is needed to reproduce the continuous audio stream with intelligible fidelity. The means for capturing the subset of audio data may be configured to capture the subset of audio data such that the subset of audio data comprises a plurality of audio data segments, each audio data segment comprising data from a different temporal component of the continuous audio stream. The means for determining the ambient environment may be configured to make a determination of an identity of a person based, at least in part, on the audio characteristics. The means for capturing the subset of audio data may be configured to capture the subset of audio data such that each of the plurality of audio data segments comprises between 30 ms to 100 ms of recorded audio.

Items and/or techniques described herein may provide one or more of the following capabilities, as well as other capabilities not mentioned. Obscuring of the content of speech that may be included in an audio stream used for a context determination while having little or no impact on the accuracy of the context determination. Utilizing a relatively simple method that can be executed in real time, using minimal processing resources. Including an ability to upload a subset of audio data (having obscured speech) to help improve the accuracy of models used in context determinations. While at least one item/technique-effect pair has been described, it may be possible for a noted effect to be achieved by means other than that noted, and a noted item/technique may not necessarily yield the noted effect.

BRIEF DESCRIPTION OF THE DRAWINGS

An understanding of the nature and advantages of various embodiments may be facilitated by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
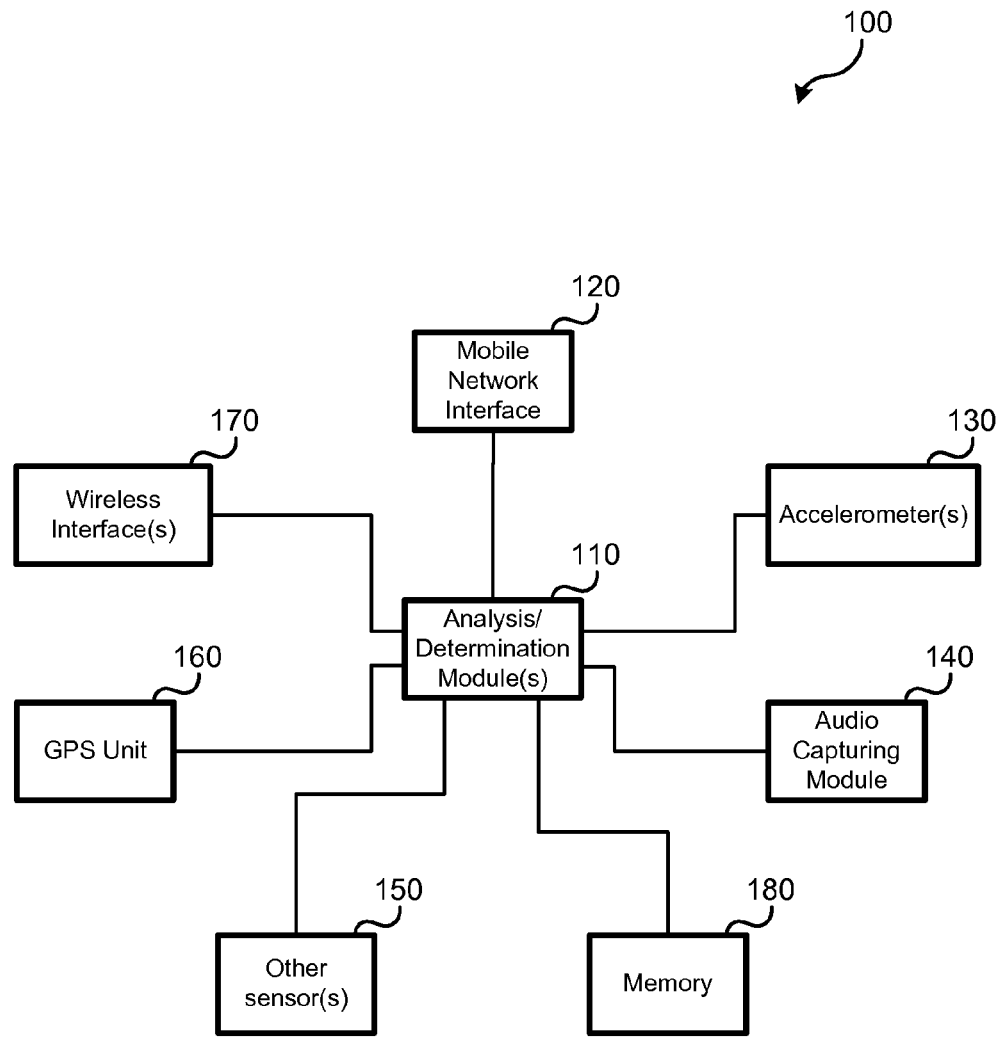
FIG. 1 is a simplified block diagram of basic components of a mobile device configured to support context awareness applications, according to one embodiment.

The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

Mobile devices, such as personal digital assistants (PDAs), mobile phones, tablet computers, and other personal electronics, can be enabled with context awareness applications. These context awareness applications can determine, for example, where a user of the mobile device is and what the user might be doing, among other things. Such context determinations can help enable a mobile device to provide additional functionality to a user, such as enter a car mode after determining the user is in a car, or entering a silent mode when determining the user has entered a movie theater.

Techniques are described herein for preserving privacy in speech that may be captured in audio used for context determinations of mobile devices. More particularly, a subset of audio data may be captured from a continuous audio stream that may contain speech, whereby the nature of the sampling obscures any speech that might be contained in the continuous audio stream. However, the nature of the sampling also preserves certain audio characteristics of the continuous audio stream such that a context determination—such as a determination regarding a particular ambient environment of a mobile device—suffers little or no reduction in accuracy. These and other techniques, are described in further detail below.

FIG. 1 is a is a simplified block diagram illustrating certain components of a mobile device 100 that can provide for context awareness, according to one embodiment. This diagram is an example and is not limiting. For example, the mobile device 100 may include additional components (e.g., user interface, antennas, display, etc.) omitted from FIG. 1 for simplicity. Additionally, the components shown may be combined, separated, or omitted, depending on the functionality of the mobile device 100.

In this embodiment, the mobile device 100 includes a mobile network interface 120. Such an interface can include hardware, software, and/or firmware for communicating with a mobile carrier. The mobile network interface 120 can utilize High Speed Packet Access (HSPA), Enhanced HSPA (HSPA+), 3GPP Long Term Evolution (LTE), and/or other standards for mobile communication. The mobile network interface 120 can also provide certain information, such as location data, that can be useful in context awareness applications.

Additionally, the mobile device 100 can include other wireless interface(s) 170. Such interfaces can include IEEE 802.11 (WiFi), Bluetooth®, and/or other wireless technologies. These wireless interface(s) 170 can provide information to the mobile device 100 that may be used in a context determination. For example, the wireless interface(s) 170 can provide information regarding location by determining the approximate location of a wireless network to which one or more of the wireless interface(s) 170 are connected. Additionally or alternatively, the wireless interface(s) 170 can enable the mobile device 100 to communicate with other devices, such as wireless headsets and/or microphones, which may provide information useful in determining a context of the mobile device 100.

The mobile device 100 also can include a global positioning system (GPS) unit 160, accelerometer(s) 130, and/or other sensor(s) 150. These additional features can provide information such as location, orientation, movement, temperature, proximity, etc. As with the wireless interface(s) 170, information from these components can help context awareness applications make a context determination regarding the context of the mobile device 100.

The mobile device 100 additionally can include an analysis/determination module(s) 110. Among other things, the analysis/determination module(s) 110 can receive sensor information from the various components to which it is communicatively coupled. The analysis/determination module(s) 110 also can execute software (including context awareness applications) stored on a memory 180, which can be separate from and/or integrated into the analysis/determination module(s) 110. Furthermore the analysis/determination module(s) 110 can comprise one or many processing devices, including a central processing unit (CPU), microprocessor, digital signal processor (DSP), and/or components that, among other things, have the means capable of analyzing audio data and making a determination based on the analysis.

Although information from wireless interfaces 170, GPS unit 160, accelerometer(s) 130, and/or other sensor(s) 150, can greatly assist in determining location when the user is outdoors, near identifiable WiFi or BlueTooth access points, walking, etc., these components have their limitations. In many scenarios they are less useful for determining environment and situation. For example, information from these components is less useful in distinguishing whether a user is in a meeting or in their office, or whether a user is in a grocery store or the gymnasium immediately next to it. In these scenarios and others, information from the audio capturing module 140 (e.g., microphone(s) and/or other audio capturing means) of the mobile device 100 can provide highly valuable audio data that can be used to help classify the environment, as well as determine whether there is speech present, whether there are multiple speakers present, the identity of a speaker, etc.

The process of capturing audio data by a mobile device 100 for a context determination can include temporarily and/or permanently storing audio data to the phone's memory 180. The capture of audio data that includes intelligible speech, however, can raise privacy issues. In fact, federal, state, and/or local laws may be implicated if the mobile device 100 captures speech from a user of the mobile device 100, or another person, without consent. These issues can be mitigated by using the hardware and/or software of the mobile device 100 to pre-process the audio data before it is captured such that speech (words, phrases and sentences) cannot be reliably reconstructed from the captured audio data. Moreover, the pre-processing can still allow determination of an ambient environment (e.g., from background noise) and/or other audio characteristics of the audio data, such as the presence of speech, music, typing sounds, etc.

Figure 2A:
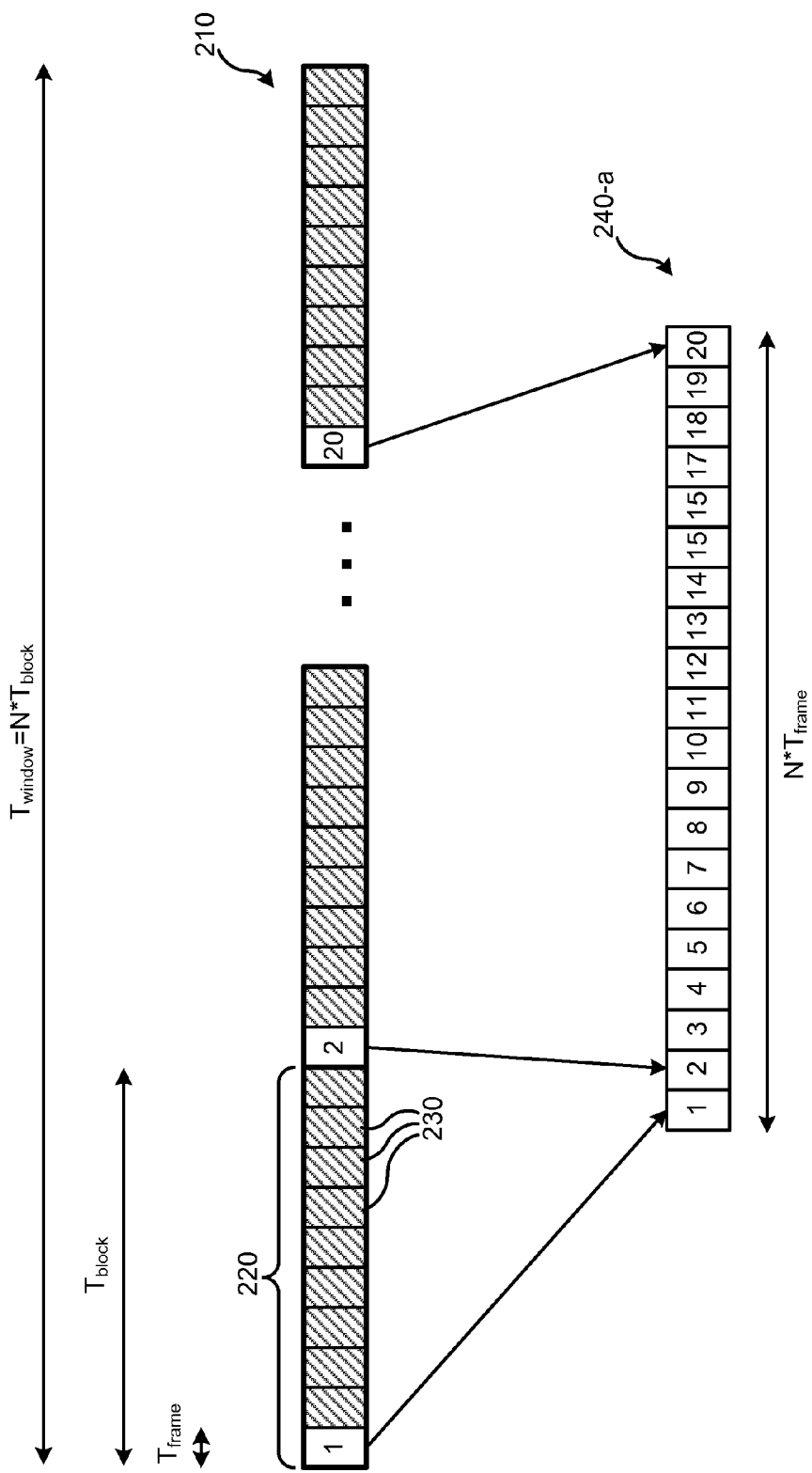
FIGS. 2a-2c are visualizations of processes for capturing sufficient audio information to classify the ambient environment of a mobile device without performance degradation, while helping ensure privacy of speech.

FIG. 2a is a visualization of a process for capturing sufficient audio information to classify a mobile device and/or user's situation/environment without performance degradation. Additionally the process can also help ensure that speech (words, phrases and sentences) cannot be reliably reconstructed from the captured information. This process involves reducing the dimensionality of an input audio stream. In other words, the bits (i.e., digital data) of an input stream of continuous audio are reduced such that the resultant audio stream has a lesser number of bits than is needed to reproduce the continuous audio stream with intelligible fidelity. Reducing the dimensionality therefore can be a computed function designed to ensure speech is irreproducible.

For example, a continuous audio stream can comprise a window 210 of audio data lasting $T_{window}$ seconds. The window 210 can be viewed as having a plurality of audio data segments. More specifically, the window 210 can comprise N temporal components, or blocks 220, where each block 220 lasts $T_{block}$ seconds and comprises a plurality of frames 230 of $T_{frame}$ seconds each. A microphone signal can be sampled such that only one frame 230 (with $T_{frame}$ seconds of data) is collected in every block of $T_{block}$ seconds.

The values of $T_{frame}$ and $T_{block}$ can vary depending on desired functionality. In one embodiment, for example $T_{frame}$=50 ms and $T_{block}$=500 ms, but these settings can vary substantially with little effect on the accuracy of a context determination that uses the resulting audio information 240-a. For example, $T_{frame}$ can range from less than 30 ms to 100 ms or more, $T_{block}$ can range from less than 250 ms up to 2000 ms (2 s) or more, and $T_{window}$ can be as short as a single block (e.g., one block per window), up to one minute or more.

Different frame, block, and window lengths can impact the number of frames 230 per block 220 and the number of blocks 220 per window 210.

The capturing of frames 230 can be achieved in different ways. For example, the analysis/determination module(s) 110 can continuously sample the microphone signal during a window 210 of continuous audio, discarding (i.e., not storing) the unwanted frames 230. Thus, in the example above where $T_{frame}$=50 ms and $T_{block}$=500 ms, the processing unit can simply discard 450 ms out of every 500 ms sampled. Additionally or alternatively, the analysis/determination module(s) 110 can turn the audio capturing module 140 off during the unwanted frames 230 (e.g., turning the audio capturing module 140 off for 450 ms out of every 500 ms), thereby collecting only the frames 230 that will be inserted into the resulting audio information 240-a used in a context determination.

The resulting audio information 240-a is a collection of frames 230 that comprises only a subset of the continuous audio stream in the window 210. Even so, this resulting audio information 240-a can include audio characteristics that can help enable a context determination, such as determining an ambient environment, with no significant impact on in the accuracy of the determination. Accordingly, the resulting audio information 240-a can be provided in real time to an application for context classification, and/or stored as one or more waveform(s) in memory 180 for later analysis and/or uploading to a server communicatively coupled to the mobile device 100.

Figure 2B:
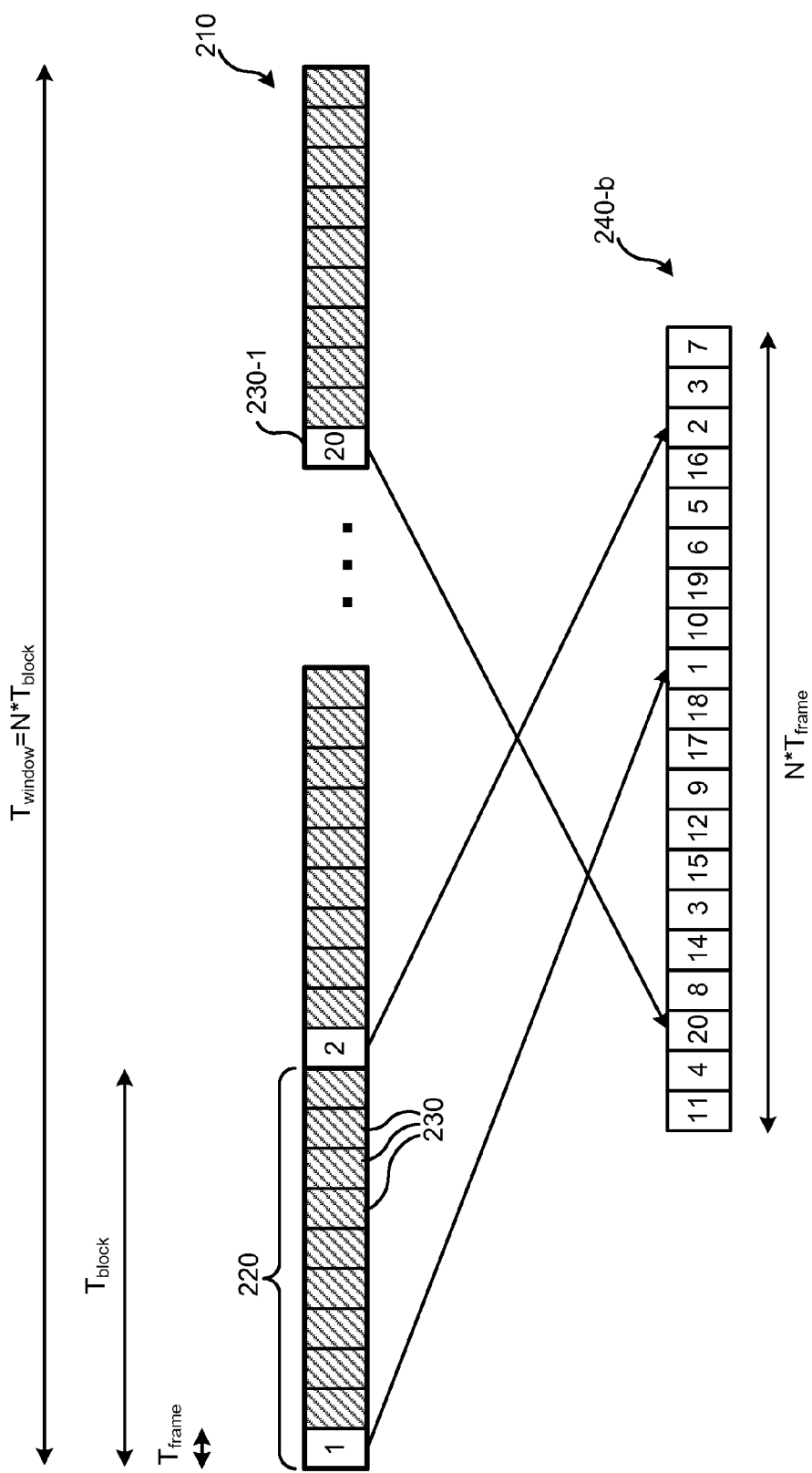
Figure 2C:
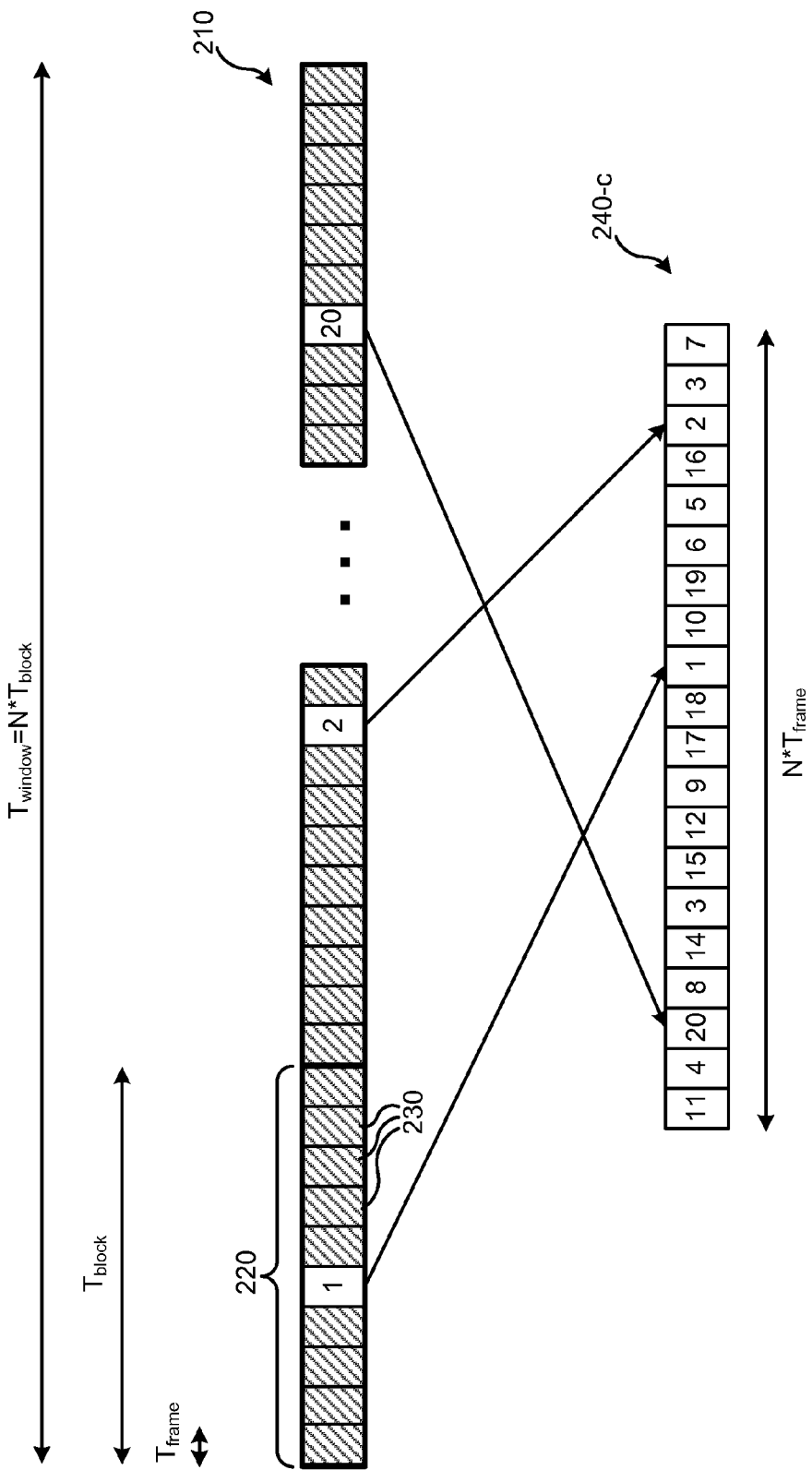

FIGS. 2b and 2c are visualizations of processes for capturing audio information, similar to the process shown in FIG. 2a. In FIGS. 2b and 2c, however, additional steps are taken to help ensure further privacy of any speech that may be captured.

Referring to FIG. 2b, a visualization is provided illustrating how, for every window 210 of $T_{window}$ seconds, the first frames 230 of each block 220 can be captured. After the frame 230-1 of the final block 220 of the window 210 is captured, all the captured frames of the window 210 can be randomly permutated (i.e. randomly shuffled) to provide the resultant audio information 240-b. Thus, the resultant audio information 240-b is similar to the resulting audio information 240-a of FIG. 2a, with the additional feature that the frames from which the resultant audio information 240-b is comprised are randomized, thereby further decreasing the likelihood that any speech that may be included in the resultant audio information 240-b could be reproduced with intelligible fidelity.

FIG. 2c illustrates a process similar to the one shown in FIG. 2b, but further randomizing the frame 230 captured for each block 220. More specifically, rather than capture the first frame 230 of each block 220 of a window 210 as shown in FIGS. 2a and 2b, the process shown in FIG. 2c demonstrates that a random frame 230 from each block 220 can be selected instead. The randomization of both the capturing of frames 230 of a window 210 and the ordering of frames 230 in the resultant audio information 240-c, helps further ensure that any speech contained in a continuous audio stream within a window 210 is obscured and irreproducible.

The randomization used in processes shown in FIGS. 2b and 2c can be computed using a seed that is generated in numerous ways. For example, the seed may be based on GPS time provided by the GPS unit 160, noise from circuitry within the mobile device 100, noise (or other signal) from the audio capturing module 140, noise from an antenna, etc. Furthermore, the permutation can be discarded (e.g., not stored) to help ensure that the shuffling effect cannot be reversed.

The processes shown in FIGS. 2a, 2b, and 2c are provided as examples and are not limiting. Other embodiments are contemplated. For example, the blocks 220 may be randomly permutated before frames 230 are captured. Alternatively, frames 230 can be captured randomly throughout the entire window 210, rather than capturing one frame 230 per block 220.

Figure 3A:
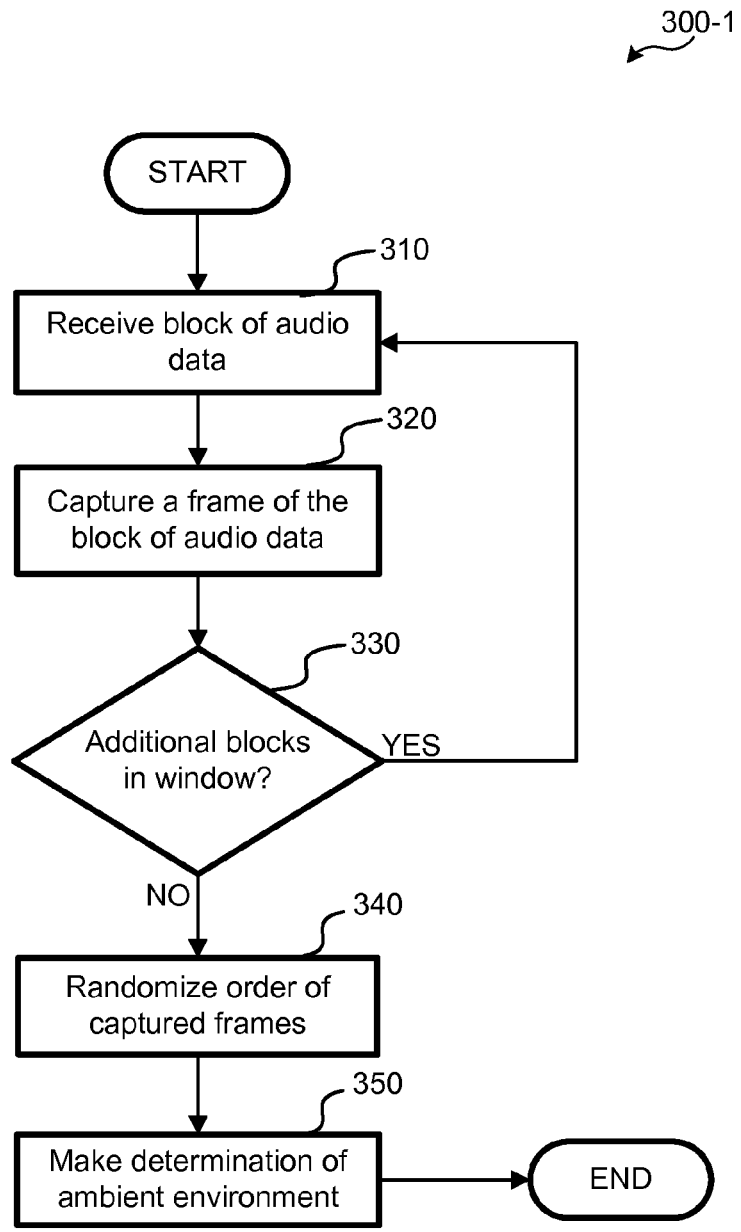
FIGS. 3a and 3b are flow diagrams of methods for providing the functionality shown in FIGS. 2b and 2c.

FIG. 3a is a flow diagram illustrating an embodiment of a method 300-1 for providing the functionality shown in FIGS. 2b and 2c. The method 300-1 can begin at stage 310, where a block 220 of audio data from a continuous audio stream is received. The continuous audio stream can be, for example, audio within a window 210 of time to which the audio capturing module 140 of a mobile device 100 is exposed.

At stage 320, a frame 230 of the block 220 of audio data is captured. As discussed earlier, the frame 230 can be a predetermined frame (e.g. first frame) of each block 220 of audio data, or it can be randomly selected. The frame 230 is captured, for example, by being stored (either temporarily or permanently) in the memory 180 of a mobile device 100. As discussed previously, the capturing of a frame 230 can include turning a audio capturing module 140 on and off and/or sampling certain portions of a signal from a audio capturing module 140 representing a continuous audio stream.

At stage 330, it is determined whether there are additional blocks 220 in the current window 210. If so, the process of capturing a frame 230 from a block 220 is repeated. This can be repeated any number of times, depending on desired functionality. For example, where $T_{block}$=500 ms and $T_{window}$=10 seconds, the process of capturing a frame 230 will be repeated 20 times, resulting in 20 captured frames 230.

If frames 230 from all blocks 220 in the current window 210 have been captured, the process moves to stage 340, where the order of the captured frames are randomized. These randomized frames can be stored, for example, in an audio file used for analysis by a context awareness application. Finally, at stage 350, a determination of the ambient environment (or other context determination) is made, based, at least in part, on audio characteristics of the randomized frames.

Different stages of the method 300-1 may be performed by one or more different components of the mobile device 100 and/or other systems communicatively coupled with the mobile device 100. Moreover, stages can be performed by any combination of hardware, software, and/or firmware. For example, to help ensure that an entire audio stream (e.g., an audio stream that may have recognizable speech) is inaccessible to software applications executed by the mobile device 100, certain stages, such as stages 320-340 can be performed by hardware (such as the analysis/determination module(s) 110), randomizing captured frames, for instance, on a buffer before storing them on the memory 180 and/or providing them to a software application. Additionally or alternatively, some embodiments may enable certain parameters (e.g., $T_{window}$, $T_{block}$, and/or $T_{frame}$) to be at least partially configurable by software.

In yet other embodiments, a mobile device 100 may upload the resultant audio information 240 including the captured frames to a remote server. In this case, the remote server can make the determination of the ambient environment of stage 350. Alternatively, the mobile device 100 can upload the resultant audio information 240 along with a determination of the ambient environment made by the mobile device 100. In either case, the remote server can use the determination and the resultant audio information 240 to modify existing models used to make ambient environment determinations. This enables the server to maintain models that are able to "learn" from input received by mobile devices 100. Modified and/or updated models then can be downloaded to mobile devices 100 to help improve the accuracy of ambient environment determinations made by the mobile devices 100. Thus, ambient environment determinations (or other contextual determinations) can be continually improved.

As indicated above, the techniques described herein can allow determination of not only an ambient environment and/or other contextual determinations, but other audio characteristics of the audio data as well. These audio characteristics can include the presence of speech, music, typing sounds, and more. Depending on the audio characteristics include, different determinations may be made.

Figure 3B:
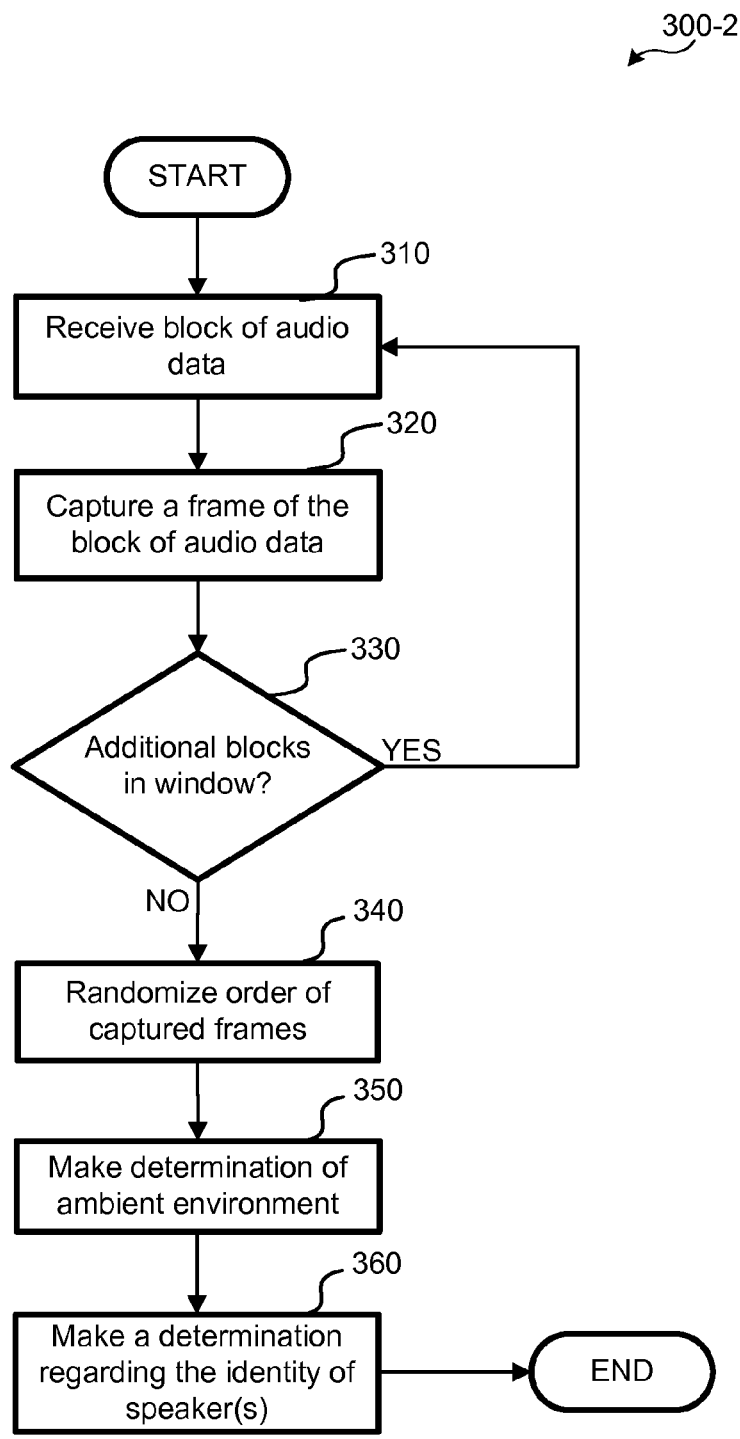

FIG. 3b a flow diagram illustrating an example of a method 300-1, which includes stages similar to the method 300-1 of FIG. 3. The method 300-2 of FIG. 3b, however, includes an additional stage 360 where a determination is made regarding the identity of speaker(s) whose speech is included in the captured frames used to made a determination of an ambient environment. As with stage 350, the determination of stage 360 can be made by the mobile device 100 and/or a remote server to which the captured frames are uploaded. Additionally, the determination regarding identity can include the use of other information and/or models, such as models to help determine the age, gender, etc. of the speaker and, stored information regarding audio characteristics of a particular person's speech, and other data.

Listening to captured audio files generated by the processes discussed above clearly demonstrates that words cannot be reliably reconstructed from this scheme. However, this notion can be demonstrated mathematically by performing an analysis to compute an upper bound on the probability of a speech recognizer reconstructing an n-grams of words, where an n-gram of words is a collection of n consecutive words, given the collected audio data from publicly-available sources for developing commercial speech recognizers.

Figure 4:
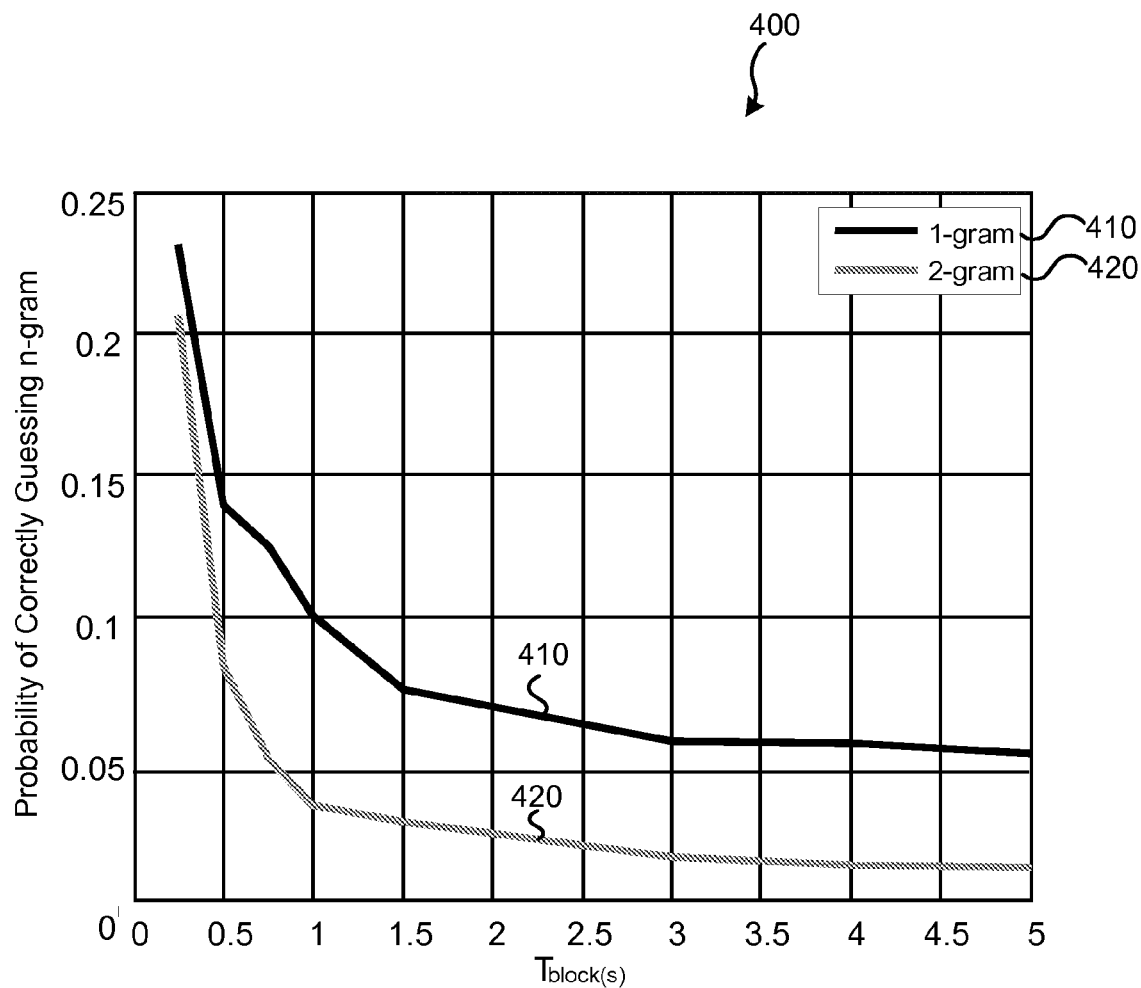
FIG. 4 is a graph illustrating results of an analysis computing an upper bound on the probability of a speech recognizer reconstructing n-grams of words, from audio data resulting from certain processing methods described herein.

FIG. 4 is a graph illustrating the results of such an analysis, showing the upper bounds on probability of correctly guessing an n-gram given collected audio. Results are shown for correctly reconstructing a 1-gram 410 and 2-gram 420 where $T_{frame}=50$ ms, for variable lengths of $T_{block}$. The probability of reconstructing an n-gram intuitively decreases with increasing n. This can be seen from FIG. 4 where, for $T_{block}=500$ ms, the probability of correctly reconstructing a 1-gram 410 is 14%, while the probability of correctly reconstructing a 2-gram 420 is 8%. (It should be noted that this analysis does not include the permutation of the frames discussed herein, which can obscure language even further, reducing probability by roughly a factor of $(T_{window}/T_{block})$ factorial.)

Despite the reduced probabilities of reconstructing speech, the techniques discussed herein have no significant impact on the ability of classifiers (e.g., probabilistic classifiers used in context awareness applications) to discern the environment of the user. This is demonstrated in Table 1, which shows the precision and recall of a context awareness classifier, with statistical models having one mixture component and two mixture components, where $T_{frame}=50$ ms and $T_{block}$ is variable. The data used was a commercially acquired audio data set of environmental sounds of a set of environments (e.g., in a park, on a street, in a market, in a car, in an airport, etc.) common among context awareness applications.

TABLE 1

| $T_{block}$ | 1 mixture component | | 2 mixture components | |
| --- | --- | --- | --- | --- |
| | Precision (%) | Recall (%) | Precision (%) | Recall (%) |
| 50 ms | 47.2 | 47.4 | 49.4 | 46.2 |
| 250 ms | 48.2 | 47.5 | 48.6 | 42.7 |
| 500 ms | 48.7 | 48.7 | 48.6 | 40.7 |
| 1 s | 48.0 | 45.8 | 43.9 | 33.3 |
| 2 s | 38.0 | 39.4 | 43.8 | 27.4 |

Because $T_{frame}=50$ ms, the precision and recall shown in Table 1 for $T_{block}=50$ ms is continuous audio. Table 1, thus indicates how reducing the dimensionality of the audio data by sampling only subsets of a continuous audio stream can have little impact on the accuracy of the classifier's determination of an ambient environment until $T_{block}$ approaches 2 seconds (i.e., the microphone is on for only 50 ms for every 2 seconds, or 2.5% of the time). Results may be different for different classifiers.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Specific details are given in the description to provide a thorough understanding of example embodiments (including implementations). However, embodiments may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Computer programs incorporating various features of the present invention may be encoded on various non-transitory computer-readable and/or non-transitory processor-readable storage media; suitable media include magnetic media, optical media, flash memory, and other non-transitory media. Non-transitory processor-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of privacy-sensitive audio analysis, the method comprising:
   capturing, by a computerized device, a subset of audio data contained in a continuous audio stream, wherein:
   the continuous audio stream contains human speech,
   the subset of audio data obscures content of the human speech,
   the subset of audio data comprises a plurality of audio data segments, and
   each audio data segment of the plurality of audio data segments is captured within a different time block of a plurality of time blocks of the continuous audio stream, each time block of the plurality of time blocks being longer in time than each audio segment;
   analyzing, by the computerized device, the subset of audio data for audio characteristics; and
   making, by the computerized device, a determination of an ambient environment, based, at least in part, on the audio characteristics.

2. The method of privacy-sensitive audio analysis of claim 1, wherein the subset of audio data comprises a computed function of the continuous audio stream having a lesser number of bits than is needed to reproduce the continuous audio stream with intelligible fidelity.

3. The method of privacy-sensitive audio analysis of claim 1, further comprising making a determination of an identity of a person based, at least in part, on the audio characteristics.

4. The method of privacy-sensitive audio analysis of claim 1, wherein each of the plurality of audio data segments comprises between 30 ms to 100 ms of recorded audio.

5. The method of privacy-sensitive audio analysis of claim 1, wherein each temporal component of the continuous audio stream is between 250 ms to 2 s in length.

6. The method of privacy-sensitive audio analysis of claim 1, further comprising randomly altering an order of the plurality of audio data segments before analyzing the subset of audio data.

7. The method of privacy-sensitive audio analysis of claim 6, wherein randomly altering the order of the plurality of audio data segments is based, at least in part, on information from one of:
   a Global Positioning System (GPS) device,
   signal noise from circuitry within a mobile device,
   signal noise from a microphone, and
   signal noise from an antenna.

8. A device for obscuring privacy-sensitive audio, the device comprising:
   a microphone; and
   a processing unit communicatively coupled to the microphone and configured to:
   capture a subset of audio data contained in a continuous audio stream represented in a signal from the microphone, wherein:
   the continuous audio stream contains human speech,
   the subset of audio data obscures content of the human speech,
   the subset of audio data comprises a plurality of audio data segments, and
   each audio data segment of the plurality of audio data segments is captured within a different time block of a plurality of time blocks of the continuous audio stream, each time block of the plurality of time blocks being longer in time than each audio segment;
   analyze the subset of audio data for audio characteristics; and
   make a determination of an ambient environment, based, at least in part, on the audio characteristics.

9. The device for obscuring privacy-sensitive audio of claim 8, wherein the subset of audio data comprises a computed function of the continuous audio stream having a lesser number of bits than is needed to reproduce the continuous audio stream with intelligible fidelity.

10. The device for obscuring privacy-sensitive audio of claim 8, wherein the processing unit is configured to make a determination of an identity of a person based, at least in part, on the audio characteristics.

11. The device for obscuring privacy-sensitive audio of claim 8, wherein each of the plurality of audio data segments comprises between 30 ms to 100 ms of recorded audio.

12. The device for obscuring privacy-sensitive audio of claim 8, wherein each temporal component of the continuous audio stream is between 250 ms to 2 s in length.

13. The device for obscuring privacy-sensitive audio of claim 8, wherein the processing unit is configured to randomly alter an order of the plurality of audio data segments before analyzing the subset of audio data.

14. The device for obscuring privacy-sensitive audio of claim 13, wherein the processing unit is configured to randomly alter the order of the plurality of audio data segments based, at least in part, on information from one of:
   a Global Positioning System (GPS) device,
   signal noise from circuitry within a mobile device,
   signal noise from the microphone, and
   signal noise from an antenna.

15. A system for determining an environment associated with a mobile device, the system comprising:
   an audio sensor configured to receive a continuous audio stream; and
   at least one processing unit coupled to the audio sensor and configured to:
   capture a subset of audio data contained in the continuous audio stream, such that the subset of audio data obscures content of human speech included in the continuous audio stream, wherein:
   the subset of audio data comprises a plurality of audio data segments, and
   each audio data segment of the plurality of audio data segments is captured within a different time block of a plurality of time blocks of the continuous audio stream, each time block of the plurality of time blocks being longer in time than each audio segment;
   analyze the subset of audio data for audio characteristics; and
   make a determination of an ambient environment, based, at least in part, on the audio characteristics.

16. The system for determining the environment associated with the mobile device of claim 15, further comprising a network interface configured to send information representing the subset of audio data via a network to a location remote from the mobile device.

17. The system for determining the environment associated with the mobile device of claim 16, wherein the at least one processing unit is configured to make the determination of the ambient environment at the location remote from the mobile device.

18. The system for determining the environment associated with the mobile device of claim 15, wherein the at least one processing unit is configured to make a determination of an identity of a person based, at least in part, on the audio characteristics.

19. The system for determining the environment associated with the mobile device of claim 15, wherein each of the plurality of audio data segments comprises between 30 ms to 100 ms of recorded audio.

20. The system for determining the environment associated with the mobile device of claim 15, wherein each temporal component of the continuous audio stream is between 250 ms to 2 s in length.

21. The system for determining the environment associated with the mobile device of claim 15, wherein the at least one processing unit is configured to randomly alter an order of the plurality of audio data segments before analyzing the subset of audio data.

22. A computer program product residing on a non-transitory processor-readable medium and comprising processor-readable instructions configured to cause a processor to:
capture a subset of audio data contained in a continuous audio stream, wherein:
the continuous audio stream contains human speech,
the subset of audio data obscures content of the human speech,
the subset of audio data comprises a plurality of audio data segments, and
each audio data segment of the plurality of audio data segments is captured within a different time block of a plurality of time blocks of the continuous audio stream, each time block of the plurality of time blocks being longer in time than each audio segment;
analyze the subset of audio data for audio characteristics; and
make a determination of an ambient environment, based, at least in part, on the audio characteristics.

23. The computer program product of claim 22, wherein the subset of audio data comprises a computed function of the continuous audio stream having a lesser number of bits than is needed to reproduce the continuous audio stream with intelligible fidelity.

24. The computer program product of claim 22, wherein the processor-readable instructions are configured to cause the processor to make a determination of an identity of a person based, at least in part, on the audio characteristics.

25. The computer program product of claim 22, wherein each of the plurality of audio data segments comprises between 30 ms to 100 ms of recorded audio.

26. The computer program product of claim 22, wherein each temporal component of the continuous audio stream is between 250 ms to 2 s in length.

27. The computer program product of claim 22, wherein the processor-readable instructions are configured cause the processor to randomly alter an order of the plurality of audio data segments before analyzing the subset of audio data.

28. The computer program product of claim 27, wherein the processor-readable instructions are configured cause the processor to randomly alter the order of the plurality of audio data segments is based, at least in part, on information from one of:
a Global Positioning System (GPS) device,
signal noise from circuitry within a mobile device,
signal noise from a microphone, and
signal noise from an antenna.

29. A device for obscuring privacy-sensitive audio, the device comprising:
means for capturing a subset of audio data contained in a continuous audio stream represented in a signal from a microphone, wherein:
the continuous audio stream contains human speech,
the subset of audio data obscures content of the human speech,
the subset of audio data comprises a plurality of audio data segments, and
each audio data segment of the plurality of audio data segments is captured within a different time block of a plurality of time blocks of the continuous audio stream, each time block of the plurality of time blocks being longer in time than each audio segment;
means for analyzing the subset of audio data for audio characteristics; and
means for determining an ambient environment, based, at least in part, on the audio characteristics.

30. The device for obscuring privacy-sensitive audio of claim 29, wherein the means for capturing the subset of audio data is configured to capture the subset of audio data in accordance with a computed function of the continuous audio stream having a lesser number of bits than is needed to reproduce the continuous audio stream with intelligible fidelity.

31. The device for obscuring privacy-sensitive audio of claim 29, wherein the means for determining the ambient environment is configured to make a determination of an identity of a person based, at least in part, on the audio characteristics.

32. The device for obscuring privacy-sensitive audio of claim 29, wherein the means for capturing the subset of audio data is configured to capture the subset of audio data such that each of the plurality of audio data segments comprises between 30 ms to 100 ms of recorded audio.

\* \* \* \* \*